United States Patent
Asai et al.

(10) Patent No.: US 10,454,084 B2
(45) Date of Patent: Oct. 22, 2019

(54) COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

(71) Applicant: ZEON CORPORATION, Chiyoda-ku, Tokyo (JP)

(72) Inventors: Kazuki Asai, Tokyo (JP); Junichi Asano, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/745,831

(22) PCT Filed: Jul. 21, 2016

(86) PCT No.: PCT/JP2016/003413
§ 371 (c)(1),
(2) Date: Jan. 18, 2018

(87) PCT Pub. No.: WO2017/026095
PCT Pub. Date: Feb. 16, 2017

(65) Prior Publication Data
US 2018/0212218 A1   Jul. 26, 2018

(30) Foreign Application Priority Data

Aug. 11, 2015 (JP) .................................. 2015-159046

(51) Int. Cl.
| H01M 2/16 | (2006.01) |
|---|---|
| C08L 33/26 | (2006.01) |
| H01M 4/13 | (2010.01) |
| H01M 4/62 | (2006.01) |
| H01M 10/05 | (2010.01) |
| H01M 10/0525 | (2010.01) |

(52) U.S. Cl.
CPC ............... *H01M 2/16* (2013.01); *C08L 33/26* (2013.01); *H01M 2/166* (2013.01); *H01M 4/13* (2013.01); *H01M 4/622* (2013.01); *C08L 2205/025* (2013.01); *C08L 2205/22* (2013.01); *H01M 10/0525* (2013.01)

(58) Field of Classification Search
CPC .......... H01M 2/16; H01M 4/13; H01M 2/166; H01M 4/622; H01M 10/0525; C08L 33/26; C08L 2205/025; C08L 2205/22

USPC ......................................................... 524/404
See application file for complete search history.

(56) References Cited

U.S. PATENT DOCUMENTS

| 2013/0171521 | A1* | 7/2013 | Sugimoto | ........... H01M 4/0404 429/211 |
| 2014/0234538 | A1* | 8/2014 | Yamada | ................. B32B 27/32 427/126.4 |
| 2016/0344007 | A1 | 11/2016 | Toyoda et al. | |

FOREIGN PATENT DOCUMENTS

| JP | 2013145763 A | * | 7/2013 |
| JP | 2013145763 A |   | 7/2013 |
| JP | 2014225410 A |   | 12/2014 |
| JP | 2015162313 A |   | 9/2015 |
| JP | 2016025093 A |   | 2/2016 |
| WO | 2015008626 A1 |   | 1/2015 |
| WO | 2015122322 A1 |   | 8/2015 |

OTHER PUBLICATIONS

Feb. 13, 2018, International Preliminary Report on Patentability issued in the International Patent Application No. PCT/JP2016/003413.
Oct. 25, 2016, International Search Report issued in the International Patent Application No. PCT/JP2016/003413.
Feb. 21, 2019, the Extended European Search Report issued by the European Patent Office in the corresponding European Patent Application No. 16834799.5.

* cited by examiner

*Primary Examiner* — Ling Siu Choi
*Assistant Examiner* — Ronald Grinsted
(74) *Attorney, Agent, or Firm* — Kenja IP Law PC

(57) ABSTRACT

Provided is a composition for a non-aqueous secondary battery functional layer that has excellent redispersibility of non-conductive particles and enables formation of a functional layer for a non-aqueous secondary battery having excellent flexibility. Also provided are a functional layer for a non-aqueous secondary battery formed using this composition for a non-aqueous secondary battery functional layer and a non-aqueous secondary battery including this functional layer for a non-aqueous secondary battery. The composition for a non-aqueous secondary battery functional layer contains non-conductive particles, a water-soluble polymer that includes a (meth)acrylamide monomer unit in a proportion of 40 mass % or more and has a weight average molecular weight of less than $3.0 \times 10^5$, and a particulate polymer.

7 Claims, No Drawings

COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

TECHNICAL FIELD

This disclosure relates to a composition for a non-aqueous secondary battery functional layer, a functional layer for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy-density, and the ability to be repeatedly charged and discharged, and are used in a wide variety of applications. A non-aqueous secondary battery generally includes battery components such as a positive electrode, a negative electrode, and a separator that isolates the positive electrode and the negative electrode from one another and prevents short circuiting between the positive and negative electrodes.

Moreover, battery components including functional layers that impart desired performance (for example, heat resistance, strength, or the like) on these battery components are used in secondary batteries. Specific examples of such battery components include a separator obtained by forming a functional layer on a separator substrate and an electrode obtained by forming a functional layer on an electrode substrate formed from a current collector and an electrode mixed material layer provided thereon. Moreover, a functional layer composed of a porous membrane layer formed by binding non-conductive particles using a binder (binding material) is one example of a functional layer that can improve heat resistance, strength, or the like of a battery component. This functional layer can be formed, for example, by applying a composition for a functional layer that contains non-conductive particles, a binder, and a dispersion medium onto the surface of a substrate (for example, a separator substrate or an electrode substrate), and then drying the applied composition for a functional layer.

In recent years, much effort has been focused on enhancing compositions for non-aqueous secondary battery functional layers used in the formation of functional layers with the aim of further raising secondary battery performance (for example, refer to PTL 1).

In one specific example, PTL 1 proposes a technique for improving binding capacity and homogeneity of a functional layer through formation thereof using a composition for a functional layer that only contains a water-soluble polymer including a repeating unit derived from (meth)acrylamide and having a weight average molecular weight of $3 \times 10^5$ to $6 \times 10^6$ as a binder.

CITATION LIST

Patent Literature

PTL 1: WO 2015/008626 A1

SUMMARY

Technical Problem

There are cases in which after a composition for a non-aqueous secondary battery functional layer is produced in a factory or the like, the composition is stored for a long period prior to being used to form a functional layer. Therefore, it is necessary that even after the composition for a non-aqueous secondary battery functional layer is stored for a long period, non-conductive particles that have sedimented can be favorably dispersed once again through stirring or the like. In other words, it is necessary for the composition for a non-aqueous secondary battery functional layer to have excellent redispersibility of non-conductive particles.

However, in the case of the composition for a non-aqueous secondary battery functional layer described in PTL 1 that only contains a water-soluble polymer as a binder, redispersibility of non-conductive particles is inadequate.

Moreover, a functional layer formed using a composition for a non-aqueous secondary battery functional layer that only contains a water-soluble polymer as a binder has inadequate flexibility, and curling of the functional layer may occur due to stress arising, for example, during drying of the composition for a functional layer to form the functional layer.

Accordingly, an objective of this disclosure is to provide a composition for a non-aqueous secondary battery functional layer that has excellent redispersibility of non-conductive particles and enables formation of a functional layer for a non-aqueous secondary battery having excellent flexibility. Another objective of this disclosure is to provide a functional layer for a non-aqueous secondary battery formed using this composition for a non-aqueous secondary battery functional layer and a non-aqueous secondary battery including this functional layer for a non-aqueous secondary battery.

Solution to Problem

The inventors conducted diligent investigation with the aim of solving the problems set forth above. Through this investigation, the inventors discovered that by using both a water-soluble polymer having a specific composition and properties and a particulate polymer in combination as a binder, it is possible to obtain a composition for a non-aqueous secondary battery functional layer that has excellent redispersibility of non-conductive particles and enables formation of a functional layer for a non-aqueous secondary battery having excellent flexibility.

Specifically, this disclosure aims to advantageously solve the problems set forth above by disclosing a composition for a non-aqueous secondary battery functional layer comprising: non-conductive particles; a water-soluble polymer that includes a (meth)acrylamide monomer unit in a proportion of 40 mass % or more and has a weight average molecular weight of less than $3.0 \times 10^5$; and a particulate polymer. Through inclusion of a water-soluble polymer that includes a (meth)acrylamide monomer unit in a proportion of 40 mass % or more and has a weight average molecular weight of less than $3.0 \times 10^5$, redispersibility of the non-conductive particles can be increased. Moreover, through combined use of the water-soluble polymer and a particulate polymer, redispersibility of the non-conductive particles can be further improved, and flexibility of a functional layer for a non-aqueous secondary battery formed using the composition for a non-aqueous secondary battery functional layer can be increased such that curling (warping) of the functional layer is inhibited.

In this disclosure, "(meth)acryl" is used to indicate "acryl" and/or "methacryl". Moreover, the phrase "includes a monomer unit" as used with respect to a polymer in this disclosure means that "a polymer obtained with the monomer includes a structural unit derived from the monomer". Furthermore, the weight average molecular weight of a water-soluble polymer in this disclosure is a weight average molecular weight in terms of polyethylene oxide measured by gel permeation chromatography using a $NaNO_3$ aqueous solution of 0.1 M as an eluent. In this disclosure, the term "water-soluble polymer" refers to a polymer that when dissolved in 100 g of water at a temperature of 25° C. in an amount of 0.5 g of the polymer, insoluble content is less than 1.0 mass %.

In the presently disclosed composition for a non-aqueous secondary battery functional layer, the water-soluble polymer is preferably contained in a proportion of at least 0.1 parts by mass and not more than 10 parts by mass per 100 parts by mass of the non-conductive particles. A water-soluble polymer content within the range set forth above can further improve redispersibility of non-conductive particles and flexibility of a functional layer for a non-aqueous secondary battery, can improve coatability of the composition for a non-aqueous secondary battery functional layer, and can increase heat resistance of a functional layer for a non-aqueous secondary battery formed using the composition for a non-aqueous secondary battery functional layer.

A presently disclosed functional layer for a non-aqueous secondary battery is formed using any of the compositions for a non-aqueous secondary battery functional layer set forth above.

Moreover, a presently disclosed non-aqueous secondary battery includes the functional layer for a non-aqueous secondary battery set forth above.

Advantageous Effect

According to this disclosure, it is possible to provide a composition for a non-aqueous secondary battery functional layer that has excellent redispersibility of non-conductive particles and enables formation of a functional layer for a non-aqueous secondary battery having excellent flexibility. Moreover, a functional layer for a non-aqueous secondary battery in which curling is inhibited and a non-aqueous secondary battery including this functional layer for a non-aqueous secondary battery can be favorably formed using this composition for a non-aqueous secondary battery functional layer.

DETAILED DESCRIPTION

The following provides a detailed description of embodiments of the present disclosure.

The presently disclosed composition for a non-aqueous secondary battery functional layer is used as a material in production of a functional layer for a non-aqueous secondary battery. Moreover, the presently disclosed functional layer for a non-aqueous secondary battery is formed using the presently disclosed composition for a non-aqueous secondary battery functional layer. Furthermore, the presently disclosed non-aqueous secondary battery includes at least the presently disclosed functional layer for a non-aqueous secondary battery.

(Composition for Non-Aqueous Secondary Battery Functional Layer)

The presently disclosed composition for a non-aqueous secondary battery functional layer is a slurry composition that has water or the like as a dispersion medium and that contains non-conductive particles and a binder, and may further contain additives and the like. A feature of the presently disclosed composition for a non-aqueous secondary battery functional layer is that a water-soluble polymer including a (meth)acrylamide monomer unit in a proportion of 40 mass % or more and having a weight average molecular weight of less than $3.0 \times 10^5$ is used in combination with a particulate polymer as the binder.

Combined use of the water-soluble polymer having a specific composition and properties and the particulate polymer as the binder in the presently disclosed composition for a non-aqueous secondary battery functional layer enables favorable redispersion of the non-conductive particles even after the composition has been stored for a long period. Moreover, a functional layer for a non-aqueous secondary battery having excellent flexibility can be formed using the presently disclosed composition for a non-aqueous secondary battery functional layer that contains the water-soluble polymer having a specific composition and properties and the particulate polymer. This inhibits curling of the functional layer for a non-aqueous secondary battery caused by stress arising, for example, during formation of the functional layer for a non-aqueous secondary battery.

<Non-Conductive Particles>

The non-conductive particles are particles that do not dissolve in the dispersion medium of the composition for a non-aqueous secondary battery functional layer or a non-aqueous electrolysis solution of a secondary battery, and that maintain their shape even when present therein. The non-conductive particles are electrochemically stable and are, therefore, present stably in a functional layer in the environment of use of a secondary battery.

Various types of inorganic fine particles and organic fine particles can be used as the non-conductive particles.

Specifically, although both inorganic fine particles and organic fine particles other than the particulate polymer used as the binder can be used as the non-conductive particles, inorganic fine particles are normally used. The material of the non-conductive particles is preferably an electrochemically stable material that is present stably in the environment of use of a non-aqueous secondary battery. Examples of non-conductive particles that are preferable from this viewpoint include particles of oxides such as aluminum oxide (alumina), hydrated aluminum oxide (boehmite (AlOOH)), gibbsite ($Al(OH)_3$), silicon oxide, magnesium oxide (magnesia), calcium oxide, titanium oxide (titania), barium titanate ($BaTiO_3$), ZrO, and alumina-silica composite oxide; particles of nitrides such as aluminum nitride and boron nitride; particles of covalent crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, or the like as necessary. Of these particles, barium sulfate particles and alumina particles are preferable as the non-conductive particles.

One of these types of non-conductive particles may be used individually, or two or more of these types of non-conductive particles may be used in combination.

The volume average particle diameter of the non-conductive particles is preferably at least 0.1 μm and not more than 1.0 μm. When the volume average particle diameter of the non-conductive particles is 0.1 μm or more, an increase in the Gurley value (i.e., a decrease in ion conductivity) of a functional layer can be suppressed and a secondary battery including the functional layer can be caused to display excellent low-temperature output characteristics. Moreover, when the volume average particle diameter of the non-conductive particles is 1.0 μm or less, the density of a functional layer can be increased and a protective function (for example, heat resistance) of the functional layer can be ensured.

The volume average particle diameter of non-conductive particles in this disclosure is a particle diameter (D50) at which, in a particle diameter distribution (volume basis) measured by laser diffraction, the cumulative volume calculated from a small-diameter end of the distribution reaches 50%.

<Water-Soluble Polymer>

The water-soluble polymer that is contained as the binder in the presently disclosed composition for a non-aqueous secondary battery functional layer includes a (meth)acrylamide monomer unit and may optionally further include an acid group-containing monomer unit, a crosslinkable monomer unit, and other monomer units.

[Composition of Water-Soluble Polymer]

Examples of (meth)acrylamide monomers that can be used to form the (meth)acrylamide monomer unit include acrylamide and methacrylamide. One of these monomers may be used individually, or two or more of these monomers may be used in combination in a freely selected ratio.

The water-soluble polymer is required to include the (meth)acrylamide monomer unit in a proportion of 40 mass % or more when the amount of all monomer units is taken to be 100 mass %. The proportion in which the (meth)acrylamide monomer unit is included in the water-soluble polymer is preferably 50 mass % or more, and more preferably 60 mass % or more, and is preferably 99 mass % or less, and more preferably 95 mass % or less. If the percentage content of the (meth)acrylamide monomer unit is less than 40 mass %, redispersibility of the non-conductive particles decreases and water-solubility of the polymer decreases. When the percentage content of the (meth)acrylamide monomer unit is at least any of the lower limits set forth above, not only can redispersibility of the non-conductive particles be increased, but also residual water content in a functional layer formed using the composition for a non-aqueous secondary battery functional layer can be reduced, which inhibits reduction of non-aqueous secondary battery high-temperature cycle characteristics. Moreover, when the percentage content of the (meth)acrylamide monomer unit is not more than any of the upper limits set forth above, functional layer heat resistance can be improved.

Examples of acid group-containing monomers that can be used to form the acid group-containing monomer unit include monomers having an acid group such as carboxylic acid group-containing monomers, sulfonate group-containing monomers, and phosphate group-containing monomers.

Examples of carboxylic acid group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfonate group-containing monomers include vinyl sulfonic acid, methyl vinyl sulfonic acid, (meth)allyl sulfonic acid, (meth)acrylic acid-2-ethyl sulfonate, 2-acrylamido-2-methyl propane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In this disclosure, "(meth)allyl" is used to indicate "allyl" and/or "methallyl", and "(meth)acryloyl" is used to indicate "acryloyl" and/or "methacryloyl".

Of these acid group-containing monomers, carboxylic acid group-containing monomers are preferable, monocarboxylic acids are more preferable, and (meth)acrylic acid is even more preferable.

One acid group-containing monomer may be used individually, or two or more acid group-containing monomers may be used in combination in a freely selected ratio.

The proportion in which the acid group-containing monomer unit is included in the water-soluble polymer is preferably 0.1 mass % or more, more preferably 0.5 mass % or more, and even more preferably 1.0 mass % or more, and is preferably 40 mass % or less, more preferably 20 mass % or less, and even more preferably 12 mass % or less. When the percentage content of the acid group-containing monomer unit is at least any of the lower limits set forth above, electrostatic repulsion of an appropriate strength can be generated between non-conductive particles having the water-soluble polymer adsorbed onto the surfaces thereof such that aggregation of the non-conductive particles is inhibited and preservation stability of the composition for a non-aqueous secondary battery functional layer is improved. Moreover, when the percentage content of the acid group-containing monomer unit is not more than any of the upper limits set forth above, residual water content in a functional layer formed using the composition for a non-aqueous secondary battery functional layer can be reduced, which inhibits reduction of non-aqueous secondary battery high-temperature cycle characteristics.

A monomer that can form a crosslinked structure during or after polymerization may be used as a crosslinkable monomer for forming the crosslinkable monomer unit. Specific examples of crosslinkable monomers include N-substituted (meth)acrylamides such as dimethylacrylamide.

Moreover, the crosslinkable monomer may be a monofunctional monomer having a thermally crosslinkable group and one ethylenically unsaturated bond per molecule or a multifunctional monomer having two or more ethylenically unsaturated bonds per molecule. Examples of the thermally crosslinkable group included in the monofunctional monomer include an epoxy group, an N-methylol amide group, an oxetanyl group, an oxazoline group, and combinations thereof. Specific examples of crosslinkable monomers that can be used include, but are not specifically limited to, crosslinkable monomers described in JP 2014-225410 A.

Among such crosslinkable monomers, allyl (meth)acrylate, ethylene di(meth)acrylate, and dimethylacrylamide are preferable, and dimethylacrylamide is more preferable. One crosslinkable monomer may be used individually, or two or more crosslinkable monomers may be used in combination in a freely selected ratio.

The proportion in which the crosslinkable monomer unit is included in the water-soluble polymer is preferably 0.01 mass % or more, more preferably 0.05 mass % or more, and even more preferably 0.1 mass % or more, and is preferably 3 mass % or less, and more preferably 2 mass % or less. When the percentage content of the crosslinkable monomer unit is at least any of the lower limits set forth above, elution of the water-soluble polymer into electrolysis solution in a non-aqueous secondary battery can be inhibited and reduction of non-aqueous secondary battery high-temperature cycle characteristics can be prevented. Moreover, when the percentage content of the crosslinkable monomer unit is not more than any of the upper limits set forth above, the viscosity of the composition for a non-aqueous secondary battery functional layer can be appropriately increased and coatability of the composition for a non-aqueous secondary battery functional layer can be improved.

The water-soluble polymer may include other monomer units besides the monomer units set forth above. Examples of other monomers that can be used to form such other monomer units include, but are not specifically limited to, esters of (meth)acrylic acid and a tertiary amino alcohol such as dimethylaminoethyl acrylate and dimethylaminopropyl acrylate. One of these monomers may be used individually, or two or more of these monomers may be used in combination in a freely selected ratio.

[Molecular Weight of Water-Soluble Polymer]

The water-soluble polymer that is contained as the binder in the presently disclosed composition for a non-aqueous secondary battery functional layer is required to have a weight average molecular weight (Mw) of less than $3.0 \times 10^5$. The weight average molecular weight of the water-soluble polymer is preferably $5.0 \times 10^3$ or more, more preferably $1.0 \times 10^4$ or more, even more preferably $8.0 \times 10^4$ or more, and particularly preferably $1.0 \times 10^5$ or more, and is preferably less than $2.0 \times 10^5$, more preferably $1.7 \times 10^5$ or less, and even more preferably $1.5 \times 10^5$ or less. Redispersibility of the non-conductive particles decreases if the weight average molecular weight of the water-soluble polymer is $3.0 \times 10^5$ or more. Although it is not clear why redispersibility of the non-conductive particles decreases if the weight average molecular weight of the water-soluble polymer is $3.0 \times 10^5$ or more, the reason is presumed to be that as a result of the main chain of the water-soluble polymer becoming longer and the number of functional groups present in a single molecule of the water-soluble polymer increasing (particularly functional groups exhibiting strong adsorption force with respect to non-conductive particles), the number of adsorbing non-conductive particles relative to a single molecule of the water-soluble polymer increases, which promotes aggregation of the non-conductive particles via the water-soluble polymer.

When the weight average molecular weight of the water-soluble polymer is not more than any of the upper limits set forth above, not only can redispersibility of the non-conductive particles be increased, but also coatability of the composition for a non-aqueous secondary battery functional layer and flexibility of a functional layer for a non-aqueous secondary battery can be improved. Moreover, when the weight average molecular weight of the water-soluble polymer is at least any of the lower limits set forth above, elution of the water-soluble polymer into electrolysis solution in a non-aqueous secondary battery can be inhibited, reduction of non-aqueous secondary battery high-temperature cycle characteristics can be prevented, coatability of the composition for a non-aqueous secondary battery functional layer can be improved, and functional layer heat resistance can be increased.

[Amount of Water-Soluble Polymer]

The amount of the water-soluble polymer that is contained as the binder in the presently disclosed composition for a non-aqueous secondary battery functional layer is preferably 0.1 parts by mass or more, more preferably 0.5 parts by mass or more, and even more preferably 1.0 parts by mass or more per 100 parts by mass of the non-conductive particles, and is preferably 10 parts by mass or less, more preferably 8 parts by mass or less, and even more preferably 5 parts by mass or less per 100 parts by mass of the non-conductive particles. Redispersibility of the non-conductive particles can be sufficiently improved by setting the content of the water-soluble polymer as at least any of the lower limits set forth above. Moreover, functional layer heat resistance and flexibility can be improved by setting the content of the water-soluble polymer as not more than any of the upper limits set forth above. Furthermore, by setting the content of the water-soluble polymer within any of the ranges set forth above, the composition for a non-aqueous secondary battery functional layer can be provided with appropriate viscosity, and coatability of the composition for a non-aqueous secondary battery functional layer can be improved.

It should be noted that increasing the content of a water-soluble polymer in a composition for a non-aqueous secondary battery functional layer normally increases residual water content in a functional layer formed using the composition for a non-aqueous secondary battery functional layer and reduces non-aqueous secondary battery high-temperature cycle characteristics. However, as a result of the water-soluble polymer contained in the presently disclosed composition for a non-aqueous secondary battery functional layer including the (meth)acrylamide monomer unit in a proportion of 40 mass % or more, residual water content in a functional layer does not readily increase even when a relatively large amount of the water-soluble polymer is compounded.

[Production Method of Water-Soluble Polymer]

The water-soluble polymer can be produced by performing polymerization of a monomer composition containing the monomers set forth above in an aqueous solvent such as water. The percentage content of each monomer in the monomer composition in this polymerization can be set in accordance with the percentage content of each repeating unit (monomer unit) in the water-soluble polymer.

The polymerization method is not specifically limited and may, for example, be any of solution polymerization, suspension polymerization, bulk polymerization, and emulsion polymerization. Also, any polymerization reaction may be used, such as ionic polymerization, radical polymerization, or living radical polymerization.

Typically used additives such as emulsifiers, dispersants, polymerization initiators, and polymerization aids may be used in the polymerization. The amounts of these additives may also be the same as typically used. The polymerization conditions may be set as appropriate depending on the method of polymerization, type of polymerization initiator, and so forth.

<Particulate Polymer>

The particulate polymer contained in the presently disclosed composition for a non-aqueous secondary battery functional layer is dispersed in the composition for a non-aqueous secondary battery functional layer in a state in which the particulate form thereof is maintained and functions as the binder in combination with the water-soluble polymer set forth above. As a result of the presently disclosed composition for a non-aqueous secondary battery functional layer containing both the water-soluble polymer and the particulate polymer in combination as the binder, rather than only containing the water-soluble polymer as the binder, redispersibility of the non-conductive particles can be further improved and flexibility of a functional layer for a non-aqueous secondary battery formed using the composition for a non-aqueous secondary battery functional layer can be increased. Accordingly, through the presently disclosed composition for a non-aqueous secondary battery functional layer, redispersibility of the non-conductive particles can be sufficiently increased while easing stress arising, for example, during formation of the functional layer and inhibiting curling (warping) of the functional layer.

Although it is not clear why redispersibility of the non-conductive particles is further improved through combined use of the water-soluble polymer and the particulate polymer, the reason is presumed to be that the particulate polymer enters between the non-conductive particles such that dense aggregation of the non-conductive particles is inhibited. Moreover, the reason for increased flexibility of the functional layer through combined use of the water-soluble polymer and the particulate polymer is presumed to be that binding of the non-conductive particles and the like by the particulate polymer is point binding rather than binding in a plane.

[Composition of Particulate Polymer]

The particulate polymer is normally a water-insoluble polymer. Examples of the particulate polymer include, but are not specifically limited to, known particulate polymers such as thermoplastic elastomers that can be used as a binder in formation of a functional layer. Specifically, the particulate polymer is preferably a conjugated diene polymer or an acrylic polymer, and more preferably an acrylic polymer, but is not specifically limited thereto. One of these particulate polymers may be used individually, or two or more of these particulate polymers may be used in combination.

When a polymer is referred to as "water-insoluble" in the present disclosure, this means that when 0.5 g of the polymer is dissolved in 100 g of water at 25° C., insoluble content is 90 mass % or more.

The conjugated diene polymer that can be preferably used as the particulate polymer is a polymer including a conjugated diene monomer unit. Specific examples of the conjugated diene polymer include, but are not specifically limited to, copolymers such as styrene-butadiene copolymer (SBR) that include an aromatic vinyl monomer unit and an aliphatic conjugated diene monomer unit, butadiene rubber (BR), acrylic rubber (NBR) (copolymer including an acrylonitrile unit and a butadiene unit), and hydrogenated products thereof.

The acrylic polymer that can be preferably used as the particulate polymer is a polymer including a (meth)acrylic acid ester monomer unit. Example of (meth)acrylic acid ester monomers that can be used to form the (meth)acrylic acid ester monomer unit include alkyl esters of (meth)acrylic acid such as methyl acrylate, ethyl acrylate, butyl acrylate, methyl methacrylate, ethyl methacrylate, and 2-ethylhexyl acrylate.

In addition to the (meth)acrylic acid ester monomer unit, the acrylic polymer preferably includes at least one type of monomer unit selected from the group consisting of a (meth)acrylonitrile monomer unit, an acid group-containing monomer unit, and a crosslinkable monomer unit, and more preferably includes a (meth)acrylonitrile monomer unit, an acid group-containing monomer unit, and a crosslinkable monomer unit. Examples of acid group-containing monomers that can be used to form the acid group-containing monomer unit and crosslinkable monomers that can be used to form the crosslinkable monomer unit include the same monomers as previously described in relation to the water-soluble polymer. In this disclosure, "(meth)acrylonitrile" is used to indicate "acrylonitrile" and/or "methacrylonitrile".

[Properties of Particulate Polymer]

The volume average particle diameter of the particulate polymer is preferably 0.01 μm or more, more preferably 0.05 μm or more, and even more preferably 0.1 μm or more, and is preferably 1.0 μm or less, more preferably 0.8 μm or less, and even more preferably 0.5 μm or less. Functional layer strength and flexibility can be sufficiently improved when the volume average particle diameter of the particulate polymer is within any of the ranges set forth above.

The volume average particle diameter of the particulate polymer in this disclosure is a particle diameter (D50) at which, in a particle diameter distribution (volume basis) measured by laser diffraction, the cumulative volume calculated from a small-diameter end of the distribution reaches 50%.

The glass transition temperature of the particulate polymer is preferably −75° C. or higher, and more preferably −55° C. or higher, and is preferably 40° C. or lower, more preferably 30° C. or lower, even more preferably 20° C. or lower, and particularly preferably 15° C. or lower. Functional layer flexibility and binding capacity can both be sufficiently increased when the glass transition temperature of the particulate polymer is within any of the ranges set forth above.

The glass transition temperature of the particulate polymer in this disclosure can be measured by differential scanning calorimetry in accordance with JIS K6240.

[Amount of Particulate Polymer]

The amount of the particulate polymer that is contained as the binder in the presently disclosed composition for a non-aqueous secondary battery functional layer is preferably 0.1 parts by mass or more, more preferably 0.5 parts by mass or more, and even more preferably 1.0 parts by mass or more per 100 parts by mass of the non-conductive particles, and is preferably 15 parts by mass or less, more preferably 10 parts by mass or less, and even more preferably 8 parts by mass or less per 100 parts by mass of the non-conductive particles. Redispersibility of the non-conductive particles can be sufficiently improved and flexibility of a functional layer can be sufficiently improved to sufficiently inhibit functional layer curling by setting the content of the particulate polymer as at least any of the lower limits set forth above. Moreover, sufficient binding capacity can be ensured and detachment of the non-conductive particles from the functional layer (dusting) can be inhibited by setting the content of the particulate polymer as at least any of the lower limits set forth above. Furthermore, sufficient functional layer porosity can be ensured, and reduction of non-aqueous secondary battery output characteristics can be inhibited by setting the content of the particulate polymer as not more than any of the upper limits set forth above.

The amount of the particulate polymer is preferably at least 0.1 times, more preferably at least 0.3 times, even more preferably at least 0.5 times, and particularly preferably at least 1.0 times the amount of the previously described water-soluble polymer, and is preferably not more than 20 times, more preferably not more than 15 times, even more preferably not more than 5 times, and particularly preferably not more than 2 times the amount of the water-soluble polymer. Functional layer flexibility can be sufficiently increased, and functional layer curling can be sufficiently inhibited when the ratio of the amount of the particulate polymer relative to the amount of the water-soluble polymer (particulate polymer/water-soluble polymer) is at least any of the lower limits set forth above. Moreover, redispersibility of the non-conductive particles and functional layer heat resistance can be sufficiently improved when the ratio of the amount of the particulate polymer relative to the amount of the water-soluble polymer is not more than any of the upper limits set forth above.

[Production Method of Particulate Polymer]

The particulate polymer can be produced by performing polymerization of a monomer composition containing monomers used in polymerization of the particulate polymer in an aqueous solvent such as water. The percentage content of each monomer in the monomer composition in this polymerization can be set in accordance with the percentage content of each repeating unit (monomer unit) in the particulate polymer.

The polymerization method is not specifically limited and may, for example, be any of solution polymerization, suspension polymerization, bulk polymerization, and emulsion polymerization. Also, any polymerization reaction can be used, such as ionic polymerization, radical polymerization, or living radical polymerization.

Typically used additives such as emulsifiers, dispersants, polymerization initiators, and polymerization aids may be used in the polymerization. The amounts of these additives may also be the same as typically used. The polymerization conditions may be set as appropriate depending on the method of polymerization, type of polymerization initiator, and so forth.

<Additives>

The composition for a non-aqueous secondary battery functional layer may further contain other optional components in addition to the components set forth above. Commonly known components can be used as these other components without any specific limitations so long as they do not affect the battery reactions. One of such other components may be used individually, or two or more of such other components may be used in combination.

Examples of other components that can be used include known additives such as dispersants and wetting agents.

[Dispersant]

Examples of dispersants that can be used include, but are not specifically limited to, sodium polycarboxylates and ammonium polycarboxylates.

The amount of dispersant that is used per 100 parts by mass of the non-conductive particles is preferably 0.05 parts by mass or more, more preferably 0.1 parts by mass or more, and even more preferably 0.2 parts by mass or more, and is preferably 5 parts by mass or less, more preferably 3 parts by mass or less, and even more preferably 2 parts by mass or less. Dispersibility of the composition for a functional layer can be sufficiently improved when the amount of dispersant is at least any of the lower limits set forth above. Moreover, residual water content in a functional layer formed using the composition for a non-aqueous secondary battery functional layer can be reduced when the amount of dispersant is not more than any of the upper limits set forth above.

[Wetting Agent]

Examples of wetting agents that can be used include, but are not specifically limited to, nonionic surfactants and anionic surfactants. Of these wetting agents, nonionic surfactants such as aliphatic polyether-type nonionic surfactants are preferable.

The amount of wetting agent that is used per 100 parts by mass of the non-conductive particles is preferably 0.05 parts by mass or more, more preferably 0.1 parts by mass or more, and even more preferably 0.15 parts by mass or more, and is preferably 2 parts by mass or less, more preferably 1.5 parts by mass or less, and even more preferably 1 part by mass of less. Coatability of the composition for a functional layer can be sufficiently improved and low-temperature output characteristics of a secondary battery including a functional layer formed using the composition for a functional layer can be sufficiently improved when the amount of wetting agent is within any of the ranges set forth above.

<Dispersion Medium>

The dispersion medium of the presently disclosed composition for a non-aqueous secondary battery functional layer is normally water. Note that a mixture of water and another solvent may be used as the dispersion medium so long as the previously described water-soluble polymer can dissolve therein and the previously described particulate polymer can maintain a particulate form therein. Examples of other solvents that can be used include, but are not specifically limited to, alicyclic hydrocarbon compounds such as cyclopentane and cyclohexane; aromatic hydrocarbon compounds such as toluene and xylene; ketone compounds such as ethyl methyl ketone and cyclohexanone; ester compounds such as ethyl acetate, butyl acetate, γ-butyrolactone, and ε-caprolactone; nitrile compounds such as acetonitrile and propionitrile; ether compounds such as tetrahydrofuran and ethylene glycol diethyl ether; alcohol compounds such as methanol, ethanol, isopropanol, ethylene glycol, and ethylene glycol monomethyl ether; and amide compounds such as N-methylpyrrolidone (NMP) and N,N-dimethylformamide. One of these other solvents may be used individually, or two or more of these other solvents may be used in combination in a freely selected ratio.

<Production Method of Composition for Non-Aqueous Secondary Battery Functional Layer>

The presently disclosed composition for a non-aqueous secondary battery functional layer can be obtained by mixing the above-described non-conductive particles, water-soluble polymer, particulate polymer, and optional additives that are used as necessary in the presence of a dispersion medium such as water, but is not specifically limited to being obtained in this manner.

Although no specific limitations are placed on the mixing method and mixing order of the above-described components, the mixing is preferably performed using a disperser as a mixing device to efficiently disperse the components. The disperser is preferably a device that can homogeneously disperse and mix the components. Examples of dispersers that can be used include a ball mill, a sand mill, a pigment disperser, a grinding machine, an ultrasonic disperser, a homogenizer, and a planetary mixer.

<Properties of Composition for Non-Aqueous Secondary Battery Functional Layer>

The viscosity of the presently disclosed composition for a non-aqueous secondary battery functional layer is preferably 10 mPa·s or more, more preferably 20 mPa·s or more, and even more preferably 30 mPa·s or more, and is preferably 200 mPa·s or less, more preferably 100 mPa·s or less, and even more preferably 80 mPa·s or less. Coatability of the composition for a functional layer can be sufficiently improved when the viscosity of the composition for a functional layer is within any of the ranges set forth above.

The viscosity of the composition for a non-aqueous secondary battery functional layer in this disclosure is the viscosity measured at a temperature of 25° C. and a rotation speed of 60 rpm using a B-type viscometer. The viscosity of the composition for a non-aqueous secondary battery functional layer can be adjusted by adjusting the molecular weight of the water-soluble polymer and the content of the components in the composition for a non-aqueous secondary battery functional layer.

(Functional Layer for Non-Aqueous Secondary Battery)

The presently disclosed functional layer for a non-aqueous secondary battery is a layer that is formed from the composition for a non-aqueous secondary battery functional layer set forth above. For example, the presently disclosed functional layer for a non-aqueous secondary battery can be formed by applying the composition for a functional layer set forth above onto the surface of a suitable substrate to form an applied film and then drying the applied film. In other words, the presently disclosed functional layer for a non-aqueous secondary battery is composed of a dried product of the composition for a non-aqueous secondary battery functional layer set forth above and normally contains non-conductive particles, a water-soluble polymer that includes a (meth)acrylamide monomer unit in a proportion of 40 mass % or more and has a weight average molecular weight of less than $3.0 \times 10^5$, a polymer derived from a particulate polymer, and optional additives. In a case in which the previously described water-soluble polymer and/or particulate polymer includes a crosslinkable monomer unit, the polymer including the crosslinkable monomer unit may be crosslinked, for example, in drying of the composition for a non-aqueous secondary battery functional layer or in heat treatment optionally performed after the drying (i.e., the functional layer for a non-aqueous secondary battery may contain a crosslinked product of the previously described water-soluble polymer and/or particulate polymer). Moreover, the polymer derived from the particulate polymer may maintain a particulate form in the functional layer for a non-aqueous secondary battery, or may adopt a form other than a particulate form in the functional layer for a non-aqueous secondary battery.

The presently disclosed functional layer for a non-aqueous secondary battery has excellent flexibility and low tendency to curl (warp) as a result of being formed using the composition for a non-aqueous secondary battery functional layer set forth above. Accordingly, it is possible to inhibit stretching and cracking, or the like, of a section of the functional layer that is curled during bending, and the functional layer has excellent handleability. Note that the composition for a non-aqueous secondary battery functional layer set forth above has excellent redispersibility of non-conductive particles and the non-conductive particles can, therefore, be favorably redispersed through stirring or the like even after the composition for a functional layer has been stored for a long period. Accordingly, a functional layer having excellent homogeneity and heat resistance can be favorably formed using the composition for a non-aqueous secondary battery functional layer set forth above even if the composition for a non-aqueous secondary battery functional layer that is used to form the functional layer has been stored for a long period.

<Substrate>

No limitations are placed on the substrate onto which the composition for a functional layer is applied. For example, an applied film of the composition for a functional layer may be formed on the surface of a detachable substrate, the applied film may be dried to form a functional layer, and then the detachable substrate may be peeled from the functional layer. A functional layer that is peeled from a detachable substrate in this manner can be used as a free-standing film in formation of a battery component of a secondary battery. Specifically, the functional layer that is peeled from the detachable substrate may be stacked on a separator substrate to form a separator that includes the functional layer or may be stacked on an electrode substrate to form an electrode that includes the functional layer.

However, it is preferable that a separator substrate or an electrode substrate is used as the substrate from a viewpoint of raising battery component production efficiency because a step of peeling the functional layer can be omitted. The functional layer provided on the separator substrate or electrode substrate can be suitably used as a protective layer for improving heat resistance and strength of the separator or electrode.

[Separator Substrate]

A known separator substrate such as an organic separator substrate can be used as the separator substrate without any specific limitations. The organic separator substrate is a porous member made from an organic material. Examples of organic separator substrates that can be used include microporous membranes and non-woven fabrics containing a polyolefin resin such as polyethylene or polypropylene, an aromatic polyamide resin, or the like. A microporous membrane or non-woven fabric made from polyethylene is preferable in terms of having excellent strength. The thickness of the separator substrate can be freely set and is preferably at least 5 µm and not more than 30 µm, more preferably at least 5 µm and not more than 20 µm, and even more preferably at least 5 µm and not more than 18 µm. A separator substrate thickness of 5 µm or more can ensure sufficient safety. Moreover, a separator substrate thickness of 30 µm or less can inhibit reduction of ion conductivity, inhibit reduction of secondary battery low-temperature output characteristics, inhibit increase of heat contraction force of the separator substrate, and increase heat resistance.

[Electrode Substrate]

The electrode substrate (positive/negative electrode substrate) is not specifically limited and may, for example, be an electrode substrate obtained by forming an electrode mixed material layer on a current collector.

The current collector, an electrode active material (positive/negative electrode active material) and a binder for an electrode mixed material layer (binder for positive/negative electrode mixed material layer) that are contained in the electrode mixed material layer, and the method by which the electrode mixed material layer is formed on the current collector may be commonly known examples thereof such as described, for example, in JP 2013-145763 A.

<Formation Method of Functional Layer for Non-Aqueous Secondary Battery>

Examples of methods by which the functional layer may be formed on a substrate such as the separator substrate or electrode substrate described above include:

(1) a method in which the presently disclosed composition for a non-aqueous secondary battery functional layer is applied onto the surface of a separator substrate or an electrode substrate (surface at the electrode mixed material layer side in the case of an electrode substrate; same applies below), and is then dried;

(2) a method in which a separator substrate or an electrode substrate is immersed in the presently disclosed composition for a non-aqueous secondary battery functional layer and subsequently dried; and (3) a method in which the presently disclosed composition for a non-aqueous secondary battery functional layer is applied onto a detachable substrate, is dried to produce a functional layer, and then the obtained functional layer is transferred onto a separator substrate or an electrode substrate.

Of these methods, the method described in (1) is particularly preferable since it allows the thickness of the functional layer to be easily controlled. The method described in (1) more specifically includes a step of applying the composition for a functional layer onto a substrate (application step) and a step of drying the composition for a functional layer that has been applied onto the substrate to form a functional layer (functional layer formation step).

It should be noted that in a situation in which the composition for a functional layer is used to form the functional layer after being stored for a long period post-production, it is preferable that the composition for a functional layer is stirred using a stirrer or the like to redisperse components contained therein prior to use.

[Application Step]

No specific limitations are placed on the method by which the composition for a functional layer is applied onto the substrate in the application step. The application method may, for example, be doctor blading, reverse roll coating, direct roll coating, gravure coating, extrusion coating, or brush coating.

[Functional Layer Formation Step]

The method by which the composition for a functional layer on the substrate is dried in the functional layer formation step is not specifically limited and may be a commonly known method. Examples of drying methods that can be used include drying by warm, hot, or low-humidity air; drying in a vacuum; and drying through irradiation with infrared light, electron beams, or the like. Although no specific limitations are placed on the drying conditions, the drying temperature is preferably 50° C. to 150° C., and the drying time is preferably 5 minutes to 30 minutes.

<Functional Layer Thickness>

The thickness of the functional layer formed using the presently disclosed composition for a non-aqueous secondary battery functional layer is preferably at least 0.5 μm and not more than 5 μm. A functional layer thickness of 0.5 μm or more further enhances a protective function of the functional layer and thereby enables further improvement of heat resistance and strength of a battery component that includes the functional layer. Moreover, a functional layer thickness of 5 μm or less enables a secondary battery to display excellent low-temperature output characteristics.

(Battery Component Including Functional Layer)

Besides the separator substrate or electrode substrate and the presently disclosed functional layer, a battery component including the presently disclosed functional layer may further include elements other than the presently disclosed functional layer so long as the effects disclosed herein are not significantly lost.

These elements other than the presently disclosed functional layer may be any elements that do not correspond to the presently disclosed functional layer, without any specific limitations. Examples thereof include an adhesive layer provided on the presently disclosed functional layer for adhesion between battery components.

(Non-Aqueous Secondary Battery)

The presently disclosed non-aqueous secondary battery includes the presently disclosed functional layer for a non-aqueous secondary battery described above. More specifically, the presently disclosed non-aqueous secondary battery includes a positive electrode, a negative electrode, a separator, and an electrolysis solution, and at least one battery component among the positive electrode, the negative electrode, and the separator includes the above-described functional layer for a non-aqueous secondary battery. The presently disclosed non-aqueous secondary battery can display excellent battery characteristics (for example, high-temperature cycle characteristics).

<Positive Electrode, Negative Electrode, and Separator>

At least one of the positive electrode, the negative electrode, and the separator used in the presently disclosed secondary battery includes the presently disclosed functional layer. Specifically, an electrode produced by forming an electrode mixed material layer on a current collector to obtain an electrode substrate, and then providing the presently disclosed functional layer on the electrode substrate may be used as a functional layer-containing positive electrode or a functional layer-containing negative electrode. Moreover, a separator produced by providing the presently disclosed functional layer on a separator substrate may be used as a functional layer-containing separator. The electrode substrate and the separator substrate can be any of the examples previously described in the "Functional layer for non-aqueous secondary battery" section.

Moreover, an electrode composed of an electrode substrate such as previously described or a separator composed of a separator substrate such as previously described may be used, without any specific limitations, as a positive electrode, negative electrode, or separator that does not include a functional layer.

<Electrolysis Solution>

The electrolysis solution is normally an organic electrolysis solution obtained by dissolving a supporting electrolyte in an organic solvent. The supporting electrolyte may, for example, be a lithium salt in the case of a lithium ion secondary battery. Examples of the lithium salt include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. Note that one electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolysis solution may be any organic solvent in which the supporting electrolyte dissolves. Examples of suitable organic solvents that can be used in the case of a lithium ion secondary battery include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of such solvents may be used. Of these solvents, carbonates are preferable due to having a high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolysis solution may be adjusted as appropriate. Furthermore, known additives may be added to the electrolysis solution.

(Production Method of Non-Aqueous Secondary Battery)

The presently disclosed non-aqueous secondary battery set forth above can be produced by, for example, stacking the positive electrode and the negative electrode with the separator in-between, performing rolling, folding, or the like of the stack as necessary to place the stack in a battery container, injecting the electrolysis solution into the battery container, and sealing the battery container. At least one of the positive electrode, the negative electrode, and the separator is a functional layer-containing component. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%", "ppm", and "parts" used to express quantities are by mass unless otherwise specified.

Moreover, in the case of a polymer that is produced through copolymerization of a plurality of types of monomers, the proportion constituted by a monomer unit in the polymer that is formed through polymerization of a given monomer is normally, unless otherwise specified, the same as the ratio (charging ratio) of the given monomer among all monomers used in polymerization of the polymer.

The following methods were used in the examples and comparative examples to measure and evaluate the volume average particle diameter of non-conductive particles, the weight average molecular weight of a water-soluble polymer, the volume average particle diameter and glass transition temperature of a particulate polymer, the viscosity, redispersibility, and coatability of a composition for a functional layer, the water content, shape, and heat contraction resistance of a functional layer, and the high-temperature cycle characteristics of a secondary battery.

<Volume Average Particle Diameter of Non-Conductive Particles>

Non-conductive particles were dispersed in a sodium hexametaphosphate aqueous solution of 0.05 mass % in concentration to obtain a dispersion liquid having a non-conductive particle concentration of 1 mass %. The dispersion liquid was irradiated with ultrasound for 2 minutes at a power of 300 W and then a particle diameter distribution (volume basis) of the non-conductive particles in the dispersion liquid was measured using a laser diffraction particle size distribution analyzer (SALD-7100 produced by Shimadzu Corporation). In the measured particle diameter distribution, the particle diameter at which the cumulative volume calculated from a small-diameter end of the distribution reached 50% was taken to be the volume average particle diameter (D50).

<Weight Average Molecular Weight of Water-Soluble Polymer>

An aqueous solution of a water-soluble polymer was diluted to 0.3 mass % with the following eluent to obtain a measurement sample. The obtained measurement sample was analyzed by gel permeation chromatography (GPC) under the following conditions to determine the weight average molecular weight of the water-soluble polymer.

GPC device: Produced by Tosoh Corporation
Column: Guard column PWXL×1, GMPWXL×1, G2500PWXL×1 (temperature 45° C.) produced by Tosoh Corporation
Eluent: 0.1 mol/L sodium nitrate ($NaNO_3$) aqueous solution
Flow rate: 0.5 mL/minute
Detector: Produced by Showa Denko K.K.; differential refractive index detector RI-201; sensitivity 16
Standard material: Monodisperse polyethylene oxide <Volume Average Particle Diameter of Particulate Polymer>

A particle diameter distribution (volume basis) of a particulate polymer in a water dispersion was measured using a laser diffraction particle size distribution analyzer (SALD-7100 produced by Shimadzu Corporation). In the measured particle diameter distribution, the particle diameter at which the cumulative volume calculated from a small-diameter end of the distribution reached 50% was taken to be the volume average particle diameter (D50).

<Glass Transition Temperature of Particulate Polymer>

A DSC curve was measured with respect to a particulate polymer in accordance with JIS K6240 using a differential scanning calorimeter (EXSTAR DSC6220 produced by SII NanoTechnology Inc.). Specifically, 10 mg of a dried measurement sample was weighed into an aluminum pan and then a DSC curve was measured in a measurement temperature range of −100° C. to 200° C., at a heating rate of 20° C./minute, and with an empty aluminum pan as a reference. In this heating process, the temperature of a heat absorption peak of a derivative signal (DDSC) was determined, and this temperature was taken to be the glass transition temperature of the particulate polymer.

<Viscosity of Composition for Functional Layer>

The viscosity of a composition for a functional layer was measured at a temperature of 25° C. and a rotation speed of 60 rpm using a B-type viscometer (TVB-10M produced by Toki Sangyo Co., Ltd.).

<Redispersibility of Composition for Functional Layer>

A composition for a functional layer having a mass W0 was sealed in a polyethylene vessel having an internal diameter of 72 mm and was left at rest for 30 days to cause sedimentation of non-conductive particles. Thereafter, an impeller having a blade diameter of 50 mm was inserted and was used to perform stirring at a rotation speed of 250 rpm to redisperse the non-conductive particles in the composition for a functional layer. The composition for a functional layer that had been stirred was then passed through a metal mesh (200 mesh), the metal mesh and residue were dried for 30 minutes in a 105° C. oven, and then the mass W1 of residue on the metal mesh was measured. The masses W0 and W1 were used to calculate the residue concentration W (=(W1/W0)×1,000,000 ppm), which was evaluated by the following standard. A smaller value for the residue concentration W indicates a smaller amount of aggregates after storage and better redispersibility.

A: Residue concentration W of less than 300 ppm
B: Residue concentration W of at least 300 ppm and less than 1,000 ppm
C: Residue concentration W of 1,000 ppm or more <Coatability of Composition for Functional Layer>

The state of a functional layer of a produced separator was observed while irradiating the separator substrate side thereof with light. The presence of streaks and uneven coating in the functional layer was evaluated. A lower degree of streaks and uneven coating in the functional layer indicates better coatability of a composition for a functional layer used to form the functional layer.

<Water Content of Functional Layer>

A separator substrate onto which a composition for a functional layer had been applied was cut out as a size of 10 cm in width by 10 cm in length to obtain a specimen. The specimen was left for 24 hours at a temperature of 25° C. and a dew point of −60° C. Thereafter, the water content of the specimen was measured by the Karl Fischer method (JIS K0068 (2001); water vaporization method; vaporization temperature 150° C.) using a coulometric titration water meter. The water content was evaluated by the following standard.

A: Water content of less than 200 ppm
B: Water content of at least 200 ppm and less than 300 ppm
C: Water content of 300 ppm or more <Shape of Functional Layer>

A separator substrate onto which a composition for a functional layer had been applied was cut out as a size of 5 cm in width by 5 cm in length to obtain a specimen. The specimen was left for 24 hours at a temperature of 25° C. and a dew point of −60° C. Thereafter, the height to which the edge of the specimen was raised through curling of the specimen was evaluated by the following standard. The height to which the edge rises is preferably small since this indicates a smaller degree of curling.

A: Raised edge height of less than 0.5 cm
B: Raised edge height of at least 0.5 cm and less than 1.0 cm
C: Raised edge height of 1.0 cm or more <Heat Contraction Resistance of Functional Layer>

A specimen was obtained by cutting out a produced separator as a 12 cm×12 cm square and then drawing a square having a side length of 10 cm inside the cut-out square. The specimen was left for 1 hour in a 130° C. thermostatic tank. Thereafter, the rate of heat contraction was determined by calculating the area change of the square drawn in the specimen (={(area of square before being left−area of square after being left)/area of square before being left}×100%) and was evaluated by the following standard. A smaller rate of heat contraction indicates that a functional layer has higher heat resistance and that the separator including the functional layer has better heat contraction resistance.

A: Heat contraction rate of less than 1%
B: Heat contraction rate of at least 1% and less than 5%
C: Heat contraction rate of 5% or more <High-Temperature Cycle Characteristics of Secondary Battery>

Ten laminate-type secondary batteries were produced. These secondary batteries were subjected to 200 cycles of a charge/discharge operation of charging to 4.2 V and discharging to 3 V by a 0.2 C constant-current method at an ambient temperature of 60° C., and the electrical capacity was measured after 5 cycles and after 200 cycles. The charge/discharge capacity retention rate was obtained by calculating, as a percentage, the ratio of an average value of the electrical capacity after 200 cycles relative to an average value of the electrical capacity after 5 cycles, and was evaluated by the following standard. A higher charge/discharge capacity retention rate indicates better high-temperature cycle characteristics.

A: Charge/discharge capacity retention rate of 80% or higher
B: Charge/discharge capacity retention rate of at least 70% and lower than 80%
C: Charge/discharge capacity retention rate of lower than 70%

Example 1

<Production of Water-Soluble Polymer>

A four-necked flask equipped with a stirrer, a thermometer, a reflux condenser, and a nitrogen gas supply tube was charged with a monomer composition containing 90 parts of acrylamide as a (meth)acrylamide monomer, 9 parts of methacrylic acid as an acid group-containing monomer, and 1 part of dimethylacrylamide as a crosslinkable monomer, 365 parts of deionized water, and 5 parts of isopropyl alcohol. Oxygen was purged from the reaction system using nitrogen gas. Next, 7 parts of a 5% ammonium persulfate aqueous solution and 3 parts of a 5% sodium bisulfite aqueous solution were charged to the flask as a polymerization initiator under stirring. Thereafter, the flask was heated from room temperature to 80° C., and was maintained at 80° C. for 3 hours to polymerize the monomer composition. Next, 162 parts of deionized water was added, and the pH was adjusted to 5 with a 48% sodium hydroxide aqueous solution to obtain an aqueous solution containing a water-soluble polymer, and having a solid content concentration of 15.2% and a viscosity (25° C., 60 rpm) of 3,050 mPa·s. The weight average molecular weight of the resultant water-soluble polymer was measured. The results are shown in Table 1.

<Production of Particulate Polymer>

A reactor equipped with a stirrer was charged with 70 parts of deionized water, 0.15 parts of sodium lauryl sulfate (EMAL® 2F (EMAL is a registered trademark in Japan, other countries, or both) produced by Kao Corporation) as an emulsifier, and 0.5 parts of ammonium peroxodisulfate as a polymerization initiator. The gas phase of the reactor was purged with nitrogen gas and the reactor was heated to 60° C.

A monomer composition was obtained in a separate flask by adding 50 parts of deionized water, 0.5 parts of sodium dodecylbenzenesulfonate as a dispersant, 94.8 parts of n-butyl acrylate (butyl acrylate) as a (meth)acrylic acid ester monomer, 1 part of methacrylic acid as an acid group-containing monomer, 2 parts of acrylonitrile as a (meth)acrylonitrile monomer, and 1.2 parts of N-methylolacrylamide and 1 part of allyl glycidyl ether as crosslinkable monomers. The monomer composition was continuously added to the reactor over 4 hours to perform polymerization. Specifically, a reaction was performed at 60° C. during addition of the monomer composition, and the reaction was completed through a further 3 hours of stirring at 70° C. after complete addition of the monomer composition to produce a water dispersion containing a particulate polymer.

The volume average particle diameter and glass transition temperature of the resultant particulate polymer were measured. The results are shown in Table 1.

<Production of Composition for Functional Layer>

Mixing was performed of 100 parts of alumina (volume average particle diameter: 0.5 μm) as non-conductive particles, 1.0 parts of ammonium polycarboxylate (Aron A-6114 produced by Toagosei Co., Ltd.) as a dispersant, and water. The amount of water was adjusted such that the solid content concentration was 50%. The resultant mixture was processed using a media-less dispersing device to disperse the alumina. The aqueous solution of the water-soluble polymer in an amount of 2.0 parts (by solid content equivalents) was added to and mixed with the resultant dispersion liquid. The added water-soluble polymer was dissolved in the mixture. Next, 3 parts (by solid content equivalents) of the water dispersion of the particulate polymer and 0.2 parts of an aliphatic polyether-type nonionic surfactant as a wetting agent were added, and water was further added to adjust the solid content concentration to 40% and obtain a composition for a functional layer (slurry composition). The viscosity and redispersibility of the resultant composition for a functional layer were evaluated.

<Production of Separator>

The produced composition for a functional layer was sealed in a polyethylene vessel and was left at rest for 30 days. Thereafter, an impeller was inserted into the polyethylene vessel and was used to perform stirring at a rotation speed of 250 rpm. The stirring was continued for 30 minutes after solid deposits could no longer be seen at the bottom of the vessel to redisperse the non-conductive particles (alumina) in the composition for a functional layer.

A single-layer polyethylene separator substrate (width: 250 mm; length: 1,000 m; thickness: 12 μm) produced by a wet method was prepared. The redispersed composition for a functional layer was applied onto one side of the separator substrate using a gravure coater (coating rate: 20 m/minute) such as to have a thickness after drying of 2.5 μm. Next, the separator substrate onto which the composition for a functional layer had been applied was dried in a 50° C. drying furnace and was then wound to produce a separator including the separator substrate and a functional layer formed thereon.

The coatability of the composition for a functional layer and the water content, form, and heat contraction resistance of the functional layer were evaluated. The results are shown in Table 1.

<Production of Positive Electrode>

A slurry composition for a positive electrode was obtained by charging 100 parts of $LiCoO_2$ (volume average particle diameter (D50): 12 μm) as a positive electrode active material, 2 parts of acetylene black (HS-100 produced by Denki Kagaku Kogyo Kabushiki Kaisha) as a conductive material, 2 parts by solid content equivalents of polyvinylidene fluoride (#7208 produced by Kureha Corporation) as a binder for a positive electrode mixed material layer, and N-methylpyrrolidone to a planetary mixer such that the total solid content concentration was 70% and performing mixing thereof.

A comma coater was used to apply the resultant slurry composition for a positive electrode onto aluminum foil (current collector) of 20 μm in thickness such as to have a thickness after drying of approximately 150 μm. The applied slurry composition was dried to obtain a positive electrode web by conveying the aluminum foil inside a 60° C. oven at a speed of 0.5 m/minute over a period of 2 minutes. The resultant positive electrode web was subsequently rolled by roll pressing to obtain a positive electrode including a positive electrode mixed material layer of 95 μm in thickness.

<Production of Negative Electrode>

A 5 MPa pressure vessel equipped with a stirrer was charged with 33.5 parts of 1,3-butadiene, 3.5 parts of itaconic acid, 62 parts of styrene, 1 part of 2-hydroxyethyl acrylate, 0.4 parts of sodium dodecylbenzenesulfonate as an emulsifier, 150 parts of deionized water, and 0.5 parts of potassium peroxodisulfate as a polymerization initiator. The contents of the pressure vessel were sufficiently stirred and were then heated to 50° C. to initiate polymerization. The reaction was terminated by cooling at the point at which the polymerization conversion rate reached 96% to yield a mixture containing a binder (SBR) for a negative electrode mixed material layer. The mixture containing the binder for a negative electrode mixed material layer was adjusted to pH 8 through addition of a 5% sodium hydroxide aqueous solution and unreacted monomers were removed therefrom by heated vacuum distillation. Thereafter, the mixture was cooled to 30° C. or lower to obtain a water dispersion containing the target binder for a negative electrode mixed material layer.

A mixture of 100 parts of artificial graphite (volume average particle diameter (D50): 15.6 μm) as a negative electrode active material and 1 part by solid content equivalents of a 2% aqueous solution of a carboxymethyl cellulose sodium salt (MAC350HC produced by Nippon Paper Industries Co., Ltd.) as a thickener was adjusted to a solid content concentration of 68% with deionized water, and was then mixed for 60 minutes at 25° C. The solid content concentration was then adjusted to 62% with deionized water and a further 15 minutes of mixing was carried out at 25° C. Next, 1.5 parts by solid content equivalents of the binder (SBR) for a negative electrode mixed material layer and deionized water were added, the final solid content concentration was adjusted to 52%, and mixing was carried out for a further 10 minutes. The resultant mixture was subjected to a defoaming process under reduced pressure to yield a slurry composition for a negative electrode having good fluidity.

A comma coater was used to apply the resultant slurry composition for a negative electrode onto copper foil (current collector) of 20 μm in thickness such as to have a thickness after drying of approximately 150 μm. The applied slurry composition was dried to obtain a negative electrode web by conveying the copper foil inside a 60° C. oven at a speed of 0.5 m/minute over a period of 2 minutes. The resultant negative electrode web was subsequently rolled by roll pressing to obtain a negative electrode including a negative electrode mixed material layer of 100 μm in thickness.

<Production of Secondary Battery>

An aluminum packing case was prepared as a battery case. The produced positive electrode was cut out as a 4.6 cm×4.6 cm square to obtain a square positive electrode. The produced separator was cut out as a 5.2 cm×5.2 cm square to obtain a square separator. The produced negative electrode was cut out as a 5 cm×5 cm square to obtain a square negative electrode. The square positive electrode was positioned inside the aluminum packing case such that a surface at the current collector side of the positive electrode was in contact with the aluminum packing case. The square separator was positioned on a surface at the positive electrode mixed material layer side of the square positive electrode such that a surface at the functional layer side of the square separator was in contact with the square positive electrode. The square negative electrode was positioned on the separator such that a surface at the negative electrode mixed material layer side of the negative electrode faced the separator. Next, an electrolysis solution (solvent: ethylene carbonate/methyl ethyl carbonate/vinylene carbonate=68.5/30/1.5 (volume ratio); electrolyte: $LiPF_6$ of 1 M in concentration) was injected into the aluminum packing case such that air did not remain. The aluminum packing case was then closed by heat sealing at 150° C. to tightly seal an opening of the aluminum packing case, and thereby produce a lithium ion secondary battery.

The high-temperature cycle characteristics of this lithium ion secondary battery were evaluated. The results are shown in Table 1.

Example 2

A water-soluble polymer, a particulate polymer, a composition for a functional layer, a separator, a positive electrode, a negative electrode, and a secondary battery were produced in the same way as in Example 1 with the exception that a monomer composition containing 65 parts of acrylamide as a (meth)acrylamide monomer, 20 parts of methacrylic acid as an acid group-containing monomer, 1 part of dimethylacrylamide as a crosslinkable monomer, and 14 parts of dimethylaminoethyl acrylate as another monomer was used as the monomer composition in production of the water-soluble polymer. Each evaluation was performed in the same way as in Example 1. The results are shown in Table 1.

Example 3

A water-soluble polymer, a particulate polymer, a composition for a functional layer, a separator, a positive electrode, a negative electrode, and a secondary battery were produced in the same way as in Example 1 with the exception that a monomer composition containing 45 parts of acrylamide as a (meth)acrylamide monomer, 20 parts of methacrylic acid as an acid group-containing monomer, 1 part of dimethylacrylamide as a crosslinkable monomer, and 34 parts of dimethylaminoethyl acrylate as another monomer was used as the monomer composition in production of the water-soluble polymer. Each evaluation was performed in the same way as in Example 1. The results are shown in Table 1.

Example 4

A water-soluble polymer, a particulate polymer, a composition for a functional layer, a separator, a positive electrode, a negative electrode, and a secondary battery were produced in the same way as in Example 1 with the exception that a monomer composition containing 90.7 parts of acrylamide as a (meth)acrylamide monomer, 9 parts of methacrylic acid as an acid group-containing monomer, and 0.3 parts of dimethylacrylamide as a crosslinkable monomer was used as the monomer composition in production of the water-soluble polymer. Each evaluation was performed in the same way as in Example 1. The results are shown in Table 1.

Example 5

A water-soluble polymer, a particulate polymer, a composition for a functional layer, a separator, a positive electrode, a negative electrode, and a secondary battery were produced in the same way as in Example 1 with the exception that in production of the water-soluble polymer, the amount of the 5% ammonium persulfate aqueous solution was changed to 1.75 parts and the amount of the 5% sodium bisulfite aqueous solution was changed to 0.75 parts. Each evaluation was performed in the same way as in Example 1. The results are shown in Table 1.

Examples 6 and 7

A water-soluble polymer, a particulate polymer, a composition for a functional layer, a separator, a positive electrode, a negative electrode, and a secondary battery were produced in the same way as in Example 1 with the exception that in production of the composition for a functional layer, the amount of the aqueous solution of the water-soluble polymer was changed to 9 parts by solid content equivalents in Example 6 and 0.2 parts by solid content equivalents in Example 7. Each evaluation was performed in the same way as in Example 1. The results are shown in Table 1.

Comparative Example 1

A water-soluble polymer, a particulate polymer, a composition for a functional layer, a separator, a positive electrode, a negative electrode, and a secondary battery were produced in the same way as in Example 1 with the exception that in production of the water-soluble polymer, the amount of the 5% ammonium persulfate aqueous solution was changed to 0.778 parts and the amount of the 5% sodium bisulfite aqueous solution was changed to 0.33 parts. Each evaluation was performed in the same way as in Example 1. The results are shown in Table 1.

Comparative Example 2

A water-soluble polymer, a particulate polymer, a composition for a functional layer, a separator, a positive electrode, a negative electrode, and a secondary battery were produced in the same way as in Example 1 with the exception that a monomer composition containing 19 parts of acrylamide as a (meth)acrylamide monomer, 20 parts of methacrylic acid as an acid group-containing monomer, 1 part of dimethylacrylamide as a crosslinkable monomer, and 60 parts of dimethylaminoethyl acrylate as another monomer was used as the monomer composition in production of the water-soluble polymer. Each evaluation was performed in the same way as in Example 1. The results are shown in Table 1.

Comparative Example 3

A water-soluble polymer, a composition for a functional layer, a separator, a positive electrode, a negative electrode, and a secondary battery were produced in the same way as in Example 1 with the exception that in production of the composition for a functional layer, a water dispersion of a particulate polymer was not added and the amount of the aqueous solution of the water-soluble polymer was changed to 3 parts by solid content equivalents. Each evaluation was performed in the same way as in Example 1. The results are shown in Table 1.

TABLE 1

| | | | | Example 1 | Example 2 | Example 3 | Example 4 | Example 5 | Example 6 |
|---|---|---|---|---|---|---|---|---|---|
| Composition for functional layer | Non-conductive particles | Volume average particle diameter [μm] | | 0.5 | 0.5 | 0.5 | 0.5 | 0.5 | 0.5 |
| | | Amount [parts by mass] | | 100 | 100 | 100 | 100 | 100 | 100 |
| | Water-soluble polymer | Composition | Acrylamide unit [mass %] | 90 | 65 | 45 | 90.7 | 90 | 90 |
| | | | Methacrylic acid unit [mass %] | 9 | 20 | 20 | 9 | 9 | 9 |
| | | | Dimethylacrylamide unit [mass %] | 1 | 1 | 1 | 0.3 | 1 | 1 |
| | | | Dimethylaminoethyl acrylate unit [mass %] | — | 14 | 34 | — | — | — |

TABLE 1-continued

|  |  |  | | | | | | |
|---|---|---|---|---|---|---|---|---|
| Particulate polymer | | Weight average molecular weight [—] | $1.29 \times 10^5$ | $1.26 \times 10^5$ | $1.48 \times 10^5$ | $8.0 \times 10^3$ | $2.80 \times 10^5$ | $1.29 \times 10^5$ |
| | | Amount [parts by mass] | 2 | 2 | 2 | 2 | 2 | 9 |
| | | Volume average particle diameter [μm] | 0.18 | 0.18 | 0.18 | 0.18 | 0.18 | 0.18 |
| | | Glass transition temperature [° C.] | −45 | −45 | −45 | −45 | −45 | −45 |
| | | Amount [parts by mass] | 3 | 3 | 3 | 3 | 3 | 3 |
| Dispersant | | Amount [parts by mass] | 1 | 1 | 1 | 1 | 1 | 1 |
| | | Compounding ratio (particulate polymer/water-soluble polymer) [—] | 1.5 | 1.5 | 1.5 | 1.5 | 1.5 | 0.33 |
| | | Viscosity [mPa · s] | 40 | 40 | 50 | 10 | 130 | 140 |
| | | Redispersibility [—] | A | A | B | A | B | A |
| | | Coatability (unevenness/streaks) [—] | None | None | None | Slight unevenness | Slight streaks | Slight streaks |
| Functional layer | | Water content [—] | A | A | B | A | A | A |
| | | Shape [—] | A | A | A | A | B | B |
| | | Heat contraction resistance [—] | A | A | B | B | B | B |
| Secondary battery | | High-temperature cycle characteristics [—] | A | A | B | B | A | A |

|  |  |  | Example 7 | Comparative Example 1 | Comparative Example 2 | Comparative Example 3 |
|---|---|---|---|---|---|---|
| Composition for functional layer | Non-conductive particles | Volume average particle diameter [μm] | 0.5 | 0.5 | 0.5 | 0.5 |
| | | Amount [parts by mass] | 100 | 100 | 100 | 100 |
| | Water-soluble polymer | Composition Acrylamide unit [mass %] | 90 | 90 | 19 | 90 |
| | | Methacrylic acid unit [mass %] | 9 | 9 | 20 | 9 |
| | | Dimethylacrylamide unit [mass %] | 1 | 1 | 1 | 1 |
| | | Dimethylaminoethyl acrylate unit [mass %] | — | — | 60 | — |
| | | Weight average molecular weight [—] | $1.29 \times 10^5$ | $4.00 \times 10^5$ | $1.29 \times 10^5$ | $1.29 \times 10^5$ |
| | | Amount [parts by mass] | 0.2 | 2 | 2 | 3 |
| | Particulate polymer | Volume average particle diameter [μm] | 0.18 | 0.18 | 0.18 | — |
| | | Glass transition temperature [° C.] | −45 | −45 | −45 | — |
| | | Amount [parts by mass] | 3 | 3 | 3 | — |
| | Dispersant | Amount [parts by mass] | 1 | 1 | 1 | 1 |
| | | Compounding ratio (particulate polymer/water-soluble polymer) [—] | 15 | 1.5 | 1.5 | — |
| | | Viscosity [mPa · s] | 15 | 150 | 40 | 60 |
| | | Redispersibility [—] | B | C | C | B |
| | | Coatability (unevenness/streaks) [—] | Slight unevenness | Streaks | None | None |
| Functional layer | | Water content [—] | A | A | C | A |
| | | Shape [—] | A | B | A | C |
| | | Heat contraction resistance [—] | B | C | B | B |
| Secondary battery | | High-temperature cycle characteristics [—] | A | A | C | A |

It can be seen from Table 1 that in Examples 1 to 7 in which a particulate polymer and a water-soluble polymer including a (meth)acrylamide monomer unit in a proportion of 40 mass % or more and having a weight average molecular weight of less than $3.0 \times 10^5$ were used in combination as a binder, a composition for a functional layer having excellent redispersibility of non-conductive particles and capable of forming a functional layer having excellent flexibility was obtained. Moreover, it can be seen from Table 1 that in Comparative Examples 1 and 2 in which a water-soluble polymer having a weight average molecular weight of at least $3.0 \times 10^5$ or a water-soluble polymer including a (meth)acrylamide monomer unit in a proportion of less than 40 mass % was used, redispersibility of non-conductive particles decreased and heat resistance of a functional layer formed using the composition for a functional layer after storage decreased. Furthermore, it can be seen from Table 1 that in Comparative Example 3 in which a particulate polymer was not also used, flexibility of the functional layer decreased and curling (warping) of the functional layer occurred.

INDUSTRIAL APPLICABILITY

According to this disclosure, it is possible to provide a composition for a non-aqueous secondary battery functional layer that has excellent redispersibility of non-conductive particles and enables formation of a functional layer for a non-aqueous secondary battery having excellent flexibility. Moreover, a functional layer for a non-aqueous secondary battery in which curling is inhibited and a non-aqueous secondary battery including this functional layer for a non-aqueous secondary battery can be favorably formed using the aforementioned composition for a non-aqueous secondary battery functional layer.

The invention claimed is:

1. A composition for a non-aqueous secondary battery functional layer comprising:
   non-conductive particles;
   a water-soluble polymer including a (meth)acrylamide monomer unit in a proportion of 40 mass % or more and having a weight average molecular weight of $5.0 \times 10^3$ or more and less than $3.0 \times 10^5$; and
   a particulate polymer.

2. The composition for a non-aqueous secondary battery functional layer according to claim 1, wherein
   the water-soluble polymer is contained in a proportion of at least 0.1 parts by mass and not more than 10 parts by mass per 100 parts by mass of the non-conductive particles.

3. A functional layer for a non-aqueous secondary battery formed using the composition for a non-aqueous secondary battery functional layer according to claim 1.

4. A non-aqueous secondary battery comprising the functional layer for a non-aqueous secondary battery according to claim 3.

5. A functional layer for a non-aqueous secondary battery formed using the composition for a non-aqueous secondary battery functional layer according to claim 2.

6. A non-aqueous secondary battery comprising the functional layer for a non-aqueous secondary battery according to claim 5.

7. The composition for a non-aqueous secondary battery functional layer according to claim 1, wherein
    the water-soluble polymer includes the (meth)acrylamide monomer unit in a proportion of 40 mass % or more and 99 mass % or less.

\* \* \* \* \*